United States Patent
Delatorre

(10) Patent No.: US 8,353,215 B2
(45) Date of Patent: Jan. 15, 2013

(54) TORQUE OUTPUT DIFFERENTIAL PRESSURE SENSOR

(76) Inventor: Leroy C. Delatorre, Sugar Land, TX (US)

( * ) Notice: Subject to any disclaimer, the term of this patent is extended or adjusted under 35 U.S.C. 154(b) by 308 days.

(21) Appl. No.: 12/802,980

(22) Filed: Jun. 17, 2010

(65) Prior Publication Data

US 2011/0005324 A1    Jan. 13, 2011

Related U.S. Application Data

(60) Provisional application No. 61/270,722, filed on Jul. 13, 2009.

(51) Int. Cl.
*G01L 9/06*    (2006.01)
(52) U.S. Cl. ............................. 73/721; 73/715
(58) Field of Classification Search .................. None
See application file for complete search history.

(56) References Cited

U.S. PATENT DOCUMENTS

| | | | | |
|---|---|---|---|---|
| 3,783,693 A | * | 1/1974 | Paros | 73/701 |
| 3,812,767 A | * | 5/1974 | Prescott | 92/48 |
| 3,853,007 A | * | 12/1974 | Jaquith | 73/706 |
| 4,030,366 A | * | 6/1977 | Kazahaya et al. | 73/715 |
| 4,570,498 A | * | 2/1986 | Okayama | 73/720 |
| 4,628,740 A | * | 12/1986 | Ueda et al. | 73/705 |
| 5,146,435 A | * | 9/1992 | Bernstein | 367/181 |
| 5,463,903 A | | 11/1995 | Delatorre | |
| 5,834,333 A | * | 11/1998 | Seefeldt et al. | 438/52 |
| 6,457,357 B1 | | 10/2002 | Stuart-Bruges | |
| 6,532,822 B1 | * | 3/2003 | Boyd | 73/702 |
| 6,535,460 B2 | * | 3/2003 | Loeppert et al. | 367/181 |

FOREIGN PATENT DOCUMENTS

WO    WO 97/21077    6/1997

* cited by examiner

*Primary Examiner* — Lisa Caputo
*Assistant Examiner* — Jermaine Jenkins
(74) *Attorney, Agent, or Firm* — W. Allen Marcontell

(57) ABSTRACT

A fluid pressure differential measuring instrument comprises a diaphragm that is displaced by a pressure differential between two environmental pressure zones. Diaphragm displacement induced by the pressure differential between the two zones is converted to a torsional strain upon a cylindrical element in a third environmental zone. The torsional strain is measured by calibrated electrical sensing means positioned physically in the third environmental zone.

20 Claims, 3 Drawing Sheets

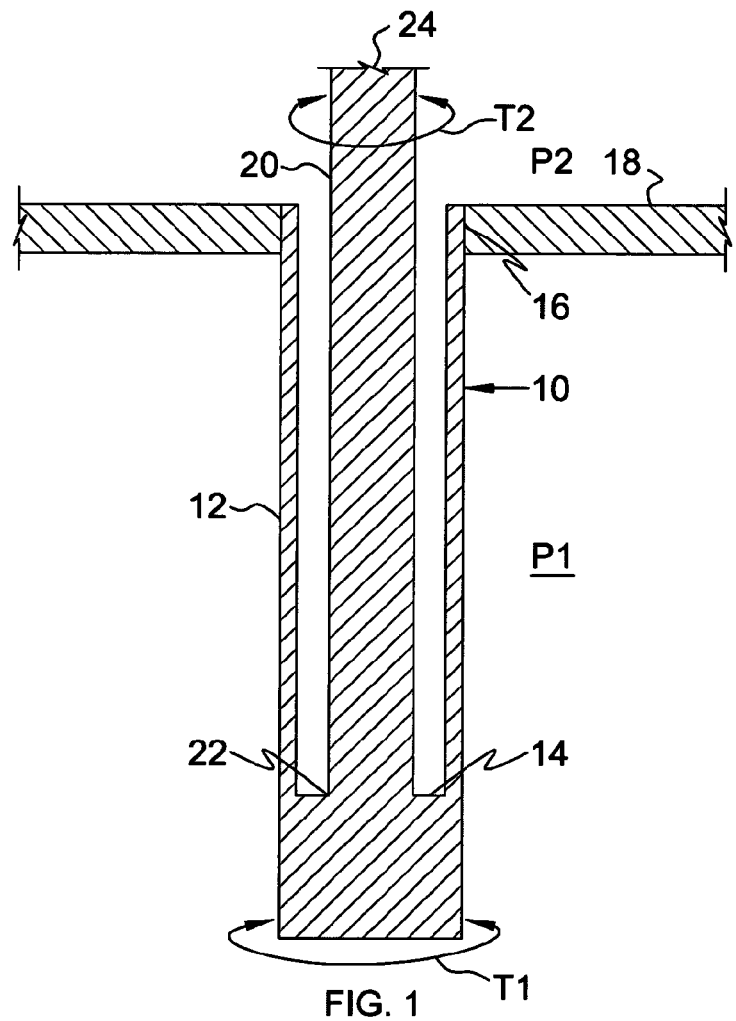
FIG. 1
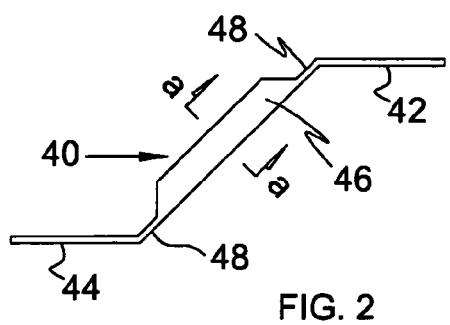
FIG. 2
FIG. 2 a-a

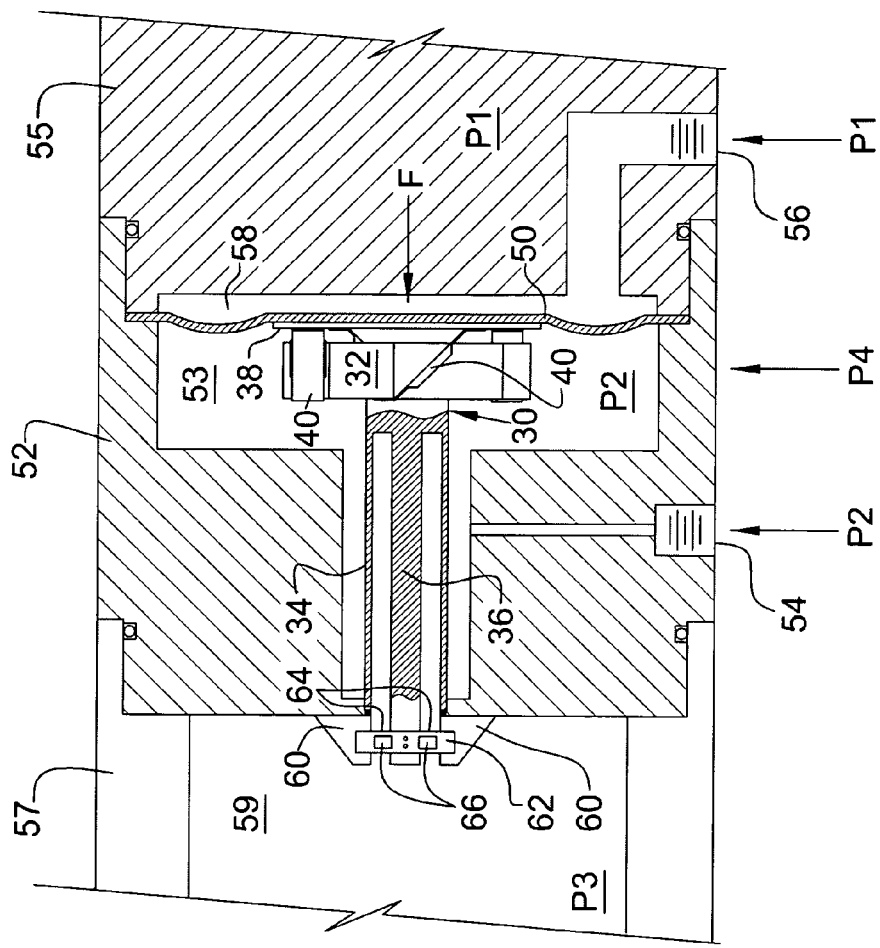
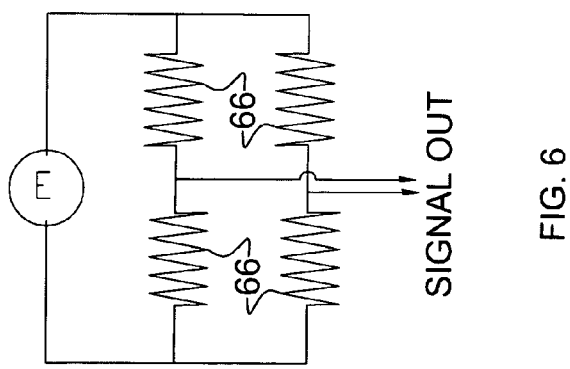
FIG. 5
FIG. 6

TORQUE OUTPUT DIFFERENTIAL PRESSURE SENSOR

CROSS-REFERENCE TO RELATED APPLICATION

The priority date benefit of Provisional Application No. 61/270,722 titled Torque Output Differential Pressure Sensor filed Jul. 13, 2009 is claimed for this application.

BACKGROUND OF THE INVENTION

1. Field of the Invention

This invention relates to a differential pressure sensor for measuring small pressure differences in an oil or gas well environment. Specifically, this environment will often include exposure to high temperatures, high pressures, corrosive media, shock and vibration. Also, an important additional requirement is usually a small diametrical size to fit within the flow bore of drill pipe, production tubing of casing.

2. Description of Related Art

Differential pressure measurements are useful in an oil or gas well to provide fluid head measurements such as for the determination of fluid density. This information is useful for quantifying the fluid composition being produced from or intruding into the well. Fluid composition identity and measurement has been successfully accomplished by radioactive means for many years. Regulations and required permits for radioactive substances, however, are becoming more cumbersome and difficult to obtain. The required red tape varies in different parts of the world and may be prohibitive. As a result of this issue, there is an increasing demand for a fluid densitometer that does not require radioactivity.

Another application for differential pressure measurement is quantifying the pressure drop developed across a flow measuring element, such as a venturi. This function can also be accomplished by using two precision static pressure gauges and taking the difference between their readings. This approach is limited for down hole applications, however, by the requirement of large full scale pressure ranges, since this pressure can be as much as 20,000 PSI, or more. The pressure differential across a flow element is normally less than 20 PSI. However, pressure gauge errors (inherent inaccuracy) are normally a percent of full scale. Consequently, measurement with a high pressure gauge may result in large errors. This gauge error may easily be 1000 times (20,000/20) greater than the stated accuracy of the individual gauges. This inaccuracy is further magnified by the square root relationship of the flow element differential pressure to flow.

Past attempts at differential pressure sensors, for this type of application, have met with many obstacles. First, the pressure difference to be measured is small, and difficult to measure in the presence of a high pressure environment. The high pressure environment also provides ample opportunity for over ranging and subsequent damage to the differential sensor. Secondly, the small diametrical size and wide operating temperature requirements, which are also coupled with potentially highly corrosive fluid media, greatly magnify the design difficulties.

It is an object of this invention, then, to provide a differential pressure sensor suitable for application in this environment.

SUMMARY OF THE INVENTION

The differential pressure sensor of the present invention is configured to have a torque output as its measurand response. The complete structure of the differential pressure sensor is exposed to the corrosive, high fluid pressure media so that it will be completely pressure balanced. The torque output is coupled into an instrument environment by means of a torque pressure isolator tube and then the conversion to an electrical signal is performed within the instrument environment. This approach completely avoids any electrical connections within the potentially corrosive high pressure environment.

BRIEF DESCRIPTION OF THE DRAWINGS

The advantages and further features of the invention will be readily appreciated by those of ordinary skill in the art as the same becomes better understood by reference to the following detailed description when considered in conjunction with the accompanying drawings in which like reference characters designate like or similar elements throughout.

FIG. 1 is an illustration of a torque pressure isolator tube;

FIG. 2 is a side view of a moment beam;

FIG. 2a is a moment beam section view taken along the cutting plane a-a of FIG. 2.

FIG. 3b is a plan view of FIG. 3a

FIG. 4b is a plan view of FIG. 4a

FIG. 5 is a partially sectioned representation of the present invention assembly as a differential pressure sensor;

FIG. 6 is a representative balance bridge strain gauge circuit.

DESCRIPTION OF THE PREFERRED EMBODIMENTS

Figure 3A:
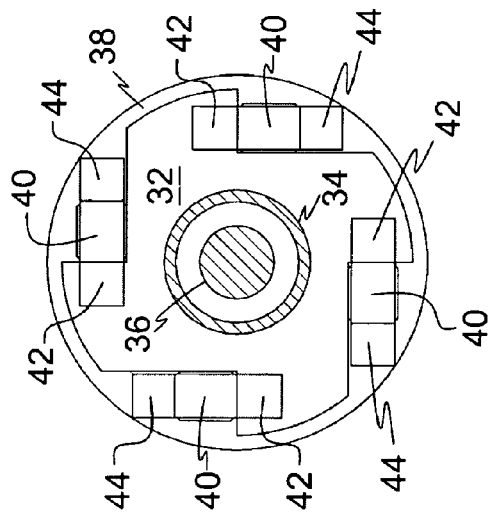
FIG. 3a is a partially sectioned side view of a differential pressure sensor under low differential pressure stress.

The measurement of small differential pressures, in the presence of relatively high static pressures, is performed routinely for applications such as those found within the petrochemical industry. The static pressure environments for such measurements, however, are generally less than about 3000 PSI (pounds-per-square inch). Furthermore, in most applications, there are few limitations as to physical size. Prior art differential pressure sensors developed for surface industry application are therefore not generally applicable for use within an oil or gas well, because static pressure can be very high (20,000 PSI, or even more) and diametrical size is limited by well bore considerations.

A major design consideration for a differential pressure sensor, having functional utility in a high static pressure environment, is the methodology employed to interface between an instrument environment and a sensing element which is deployed within the static pressure media. The sensing element can be capacitive, piezoresistive, or other, but it must be responsive to the differential pressure sensing means, such as a diaphragm, and this normally places it in intimate contact with the fluid media. The output is normally in the form of an electrical signal and exposure to a high fluid pressure environment, which may be conductive or corrosive, has the potential of degrading the signal quality. An instrument environment connection is necessary, however, to allow the information to be collected and processed.

Different approaches have been used by the prior art to deal with this issue. One prior art practice is to isolate each sensor input from the fluid media by means of an inert fluid fill, which is contained by isolation diaphragms. The diaphragms are designed to pass the pressure media input pressure to the fluid fill which, in turn, applies pressure to the sensor inputs. This approach allows electrical sensing elements, such as strain gauges, to be placed on the structure, within the fluid fill, without concern for any potential degradation from the external pressure media. The approach, however, requires the isolation diaphragms to have enough free travel displacement to allow the fill fluid to expand with temperature. Down hole applications can have temperatures up to 200 degrees Celsius, or more.

The fundamental measurement method conceived for this invention is to develop a torque output, within the sensor, which is representative of the measurand. Torque can be passed from the high pressure environment into an instrument environment by means of a calibrated pressure isolation chamber as depicted in FIG. 1. In this figure, the isolation chamber 10 is simply a cylindrical tube 12 with one end closed at 14 and the other end attached at 16 to pressure vessel 18. The closed end 14 has one end 22 of a shaft 20 attached to it so that an applied torque $T_1$, less the torque required to deflect the torque tube, will then be applied to the free end 24. It is apparent that the applied torque $T_1$ (which exists within pressure environment $P_1$), will result in an output torque $T_2$ (which exists within pressure environment $P_2$) and that the input and output torques can be exchanged. Exchanging $T_1$ and $T_2$ can be used to reverse the pressure environments, $P_1$ and $P_2$.

Of course, the stress effects of a pressure difference between $P_1$ and $P_2$ will cause distortions in the isolation tube 10. However, none of these distortions will cause an error in the torque values $T_1$ or $T_2$. The effect of this arrangement, then, is to allow a torque to be coupled from one pressure level to another without the friction effects of a seal, nor any of the errors associated with distortions caused by the pressure difference. Optimum performance of this device, however, will require that the resultant displacements, due to the torque forces, must be kept small to stay within the strength limitations of the torque tube 12.

Figure 3B:
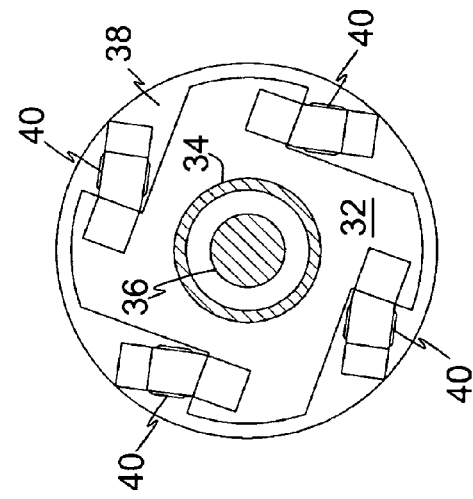
Figure 4A:
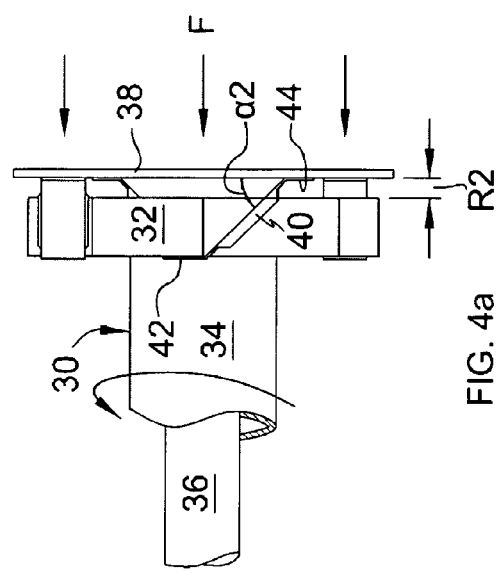
FIG. 4a is a partially sectioned side view of the FIG. 3 differential pressure sensor under high differential pressure stress.
Figure 4B:
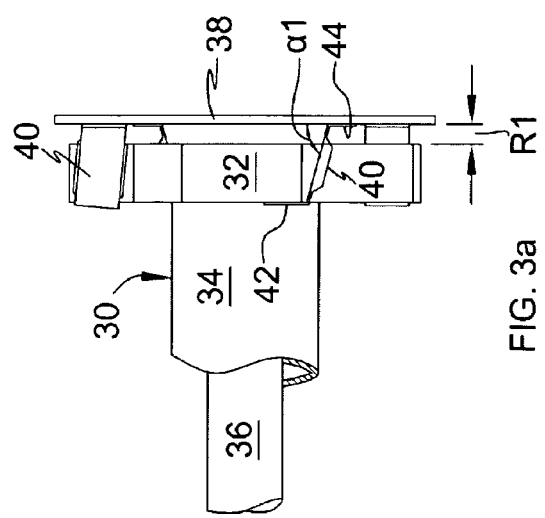

An exaggerated application of the FIG. 1 principle is illustrated by FIGS. 3 and 4 wherein the side and plan views 3a and 3b, respectively, show the mechanism in a relatively unstressed state. FIGS. 4a and 4b show the same mechanism under the stress of force F applied to the relatively displaced reciprocation force plate 38.

An isolation assembly 30 comprises a torque disc 32 that is firmly secured coaxially to one end of an isolation cylinder 34. The opposite end of the isolation cylinder is firmly secured and sealed within or about an aperture through the wall of a pressure vessel.

A sensor shaft 36 is also firmly secured to the torque disc 32 coaxially within the isolation cylinder 34 and is projected to pass through the pressure vessel wall aperture sealed by the isolation cylinder 34.

The reciprocating plate 38 is physically linked to the torque disc 32 by a motion translation means comprising moment beams 40 that are rigidly secured to the plate 38 and disc 32. Preferably, the moment beams 40 are symmetrically secured around the respective perimeters of the reciprocation plate 38 and torque disc 32.

As illustrated independently by FIGS. 2 and 2a, the moment beams 40 are preferably fabricated from a stable, resilient material such as a precipitation hardening stainless steel an Inconel alloy, for example. The beams are secured to the torque disc 32 by tabs 42 and to the reciprocation plate 38 by tabs 44. The appropriate tab attachment to the respective components may be by welding, or brazing, etc. Between the tabs 42 and 44 is a rigid channel span 46 as shown by FIG. 2a and the a-a cut section of FIG. 2. The moment beams 40 are designed for flexing in the transitional junction zones 48 between the tabs 42, 44 and the channel span 46.

The angular displacement of the torque disc 32 shown by FIG. 4b relative to the torque disc position of FIG. 3b is exaggerated to illustrate the operating principle of the invention. Due to the thrust angle α at which the moment beams are set between the reciprocating force plate 38 and the torque disc 32, a force F induced linear displacement of the plate 38 relative to the torque disc 32 by the displacement differential between $R_1$ and $R_2$, a rotational stress is imposed upon the torque disc 32 that is opposed by a torsional stress along the isolation cylinder 34. The degree of torsional strain imposed by the stress on cylinder 32 is transferred as rotated displacement along the sensor shaft 36.

Although a comparison of the moment beam angular differential between $\alpha_1$ in FIG. 3 and $\alpha_2$ of FIG. 4a is shown to be significant, in practice this angular difference should be insignificant. Physical displacements of the components, both linerally and rotatively should be minimal for desired measuring accuracy.

FIG. 5 schematically illustrates a combination of the mechanisms described above to determine the pressure differential between pressure zones $P_1$ and $P_2$ separated by a diaphragm 50. The diaphragm perimeter is compressively sealed between the joint ends of a $P_1$ pressure housing 55 and the instrument housing sub 52. Pressure $P_1$ is introduced to the volumetric space 58 of the housing sub 52 through the fluid connection port 56. Pressure $P_2$ is introduced to the volumetric space 53 through the fluid connection port 54. A reciprocating force plate 38 is secured to the diaphragm 50 within the volumetric space 53 side of the diaphragm 50 membrane. Housing sub 57, also sealed to the instrument housing sub 52, confines pressure $P_3$ in an environmentally protected space 59. The diaphragm 50 is closely confined between pressure housing 55 and force plate 38 so that an over pressure difference between $P_1$ and $P_2$ will limit the travel of the diaphragm and therefore provide overpressure protection.

Any pressure differential between $P_1$ and $P_2$ will generate an axial force F upon the diaphragm membrane 50 and the reciprocating force plate 38. It will be understood by those of skill in the art that the terms "reciprocating" and "lineal" used herein to describe the translational displacement of the force plate 38, are used loosely and in practice may not conform strictly to the technical definitions of those terms. Displacement of the force plate 38, by the differential pressure force F, is constrained from any angular displacement by virtue of its attachment to diaphragm, 50. The resultant axial displacement is transferred by the moment beams 40 to the torque disc 32 at points displaced from the disc 32 axis and with a vector component normal to the disc 32 axis. Accordingly, a rotative or angular displacement imposed upon the disc 32 is opposed by a corresponding torsional stress along stress/strain calibrated isolation cylinder 34. The base of cylinder 34 is fixed by welding to the pressure housing 52. The torsional strain consequence of the torsional stress in the isolation cylinder 34, then, is transferred along the sensor shaft 36 to an electrical sensor assembly disposed within the protected space 59. The terms "rotative" or "angular" are used in the sense of some, however minute, angular displacement about an axis: albeit less than a full revolution.

An electrical sensing means for translating the angular displacement of the sensor shaft 36 to an electrical property corresponding to the lineally detected pressure differential may comprise, for example, piezoresistive or capacitive devices. In a preferred by not exclusive embodiment of the invention, a piezoresistive strain gauge assembly is provided. This strain gauge sensor assembly comprises a pair of pylons 60 within the protected environment volume 59 that flank a projection of the sensor shaft 36. A pair of thin metallic substrate beams 62 bridge opposite faces of the two pylons 60 and are firmly secured thereto. In like manner, the two beams 62 are secured along opposite tangent lines to the sensor shaft 36. Only one substrate beam, 62, is shown by the single side view of FIG. 5. The other moment beam of the two is parallel to the first on the opposite side of the pylons 60 and sensor shaft 36.

This arrangement of the two beams 62 secured to the two pylons 60 and to the sensor shaft 36 in between provides four beam spans 64 between the sensor shaft 36 and a pylon 60. Each of these four beam spans 64 supports a strain gauge coupon 66. The four strain gauge coupons may be electrically connected into a balanced bridge circuit such as that represented by FIG. 6. Any angular displacement of the sensor shaft 36 due to torsional strain of the isolation cylinder 34 will produce proportional changes in the electrical properties of the balanced bridge circuit such as resistance. These electrical property changes may be correlated to the pressure differential across the diaphragm 50.

Although those of skill in the art will recognize that other pressure differential displacement means or mechanisms may be applicably substituted for the diaphragm 50 such as pistons or Bourdon tubes, a diaphragm mechanism is preferred due to simplicity and absence of friction losses.

The entire support structure of diaphragm 50 is pressure balanced if the external pressure, P4, is close to the values of P1 and P2. This is generally the case for venturi measurements within a well bore and always the case for fluid head measurements to determine fluid density. This is important because the effects of a high static pressure $P_4$ on the diaphragm support structure are completely avoided so that no significant absolute static pressure related stress is induced against the diaphragm 17. This will be true even if the static pressure $P_4$ outside the pressure housings 55 and 57 is extremely high or is reduced to atmospheric pressure.

As is seen in FIG. 5, the diaphragm 50 provides a true differential pressure measurement between pressures $P_1$ and $P_2$ and this measurement is then conveyed via the sensor shaft 36 to an instrument environment in volume 59 at pressure $P_3$. The entire assembly is immersed in a surrounding fourth static pressure $P_4$. Conversion of the torque value into an appropriate electrical value is done entirely within the instrument environment of volume 59. This precludes a need for electrical connections or components to be located within the potentially hostile static environment of $P_1$, $P_2$ or $P_4$.

One example of operational utility for the invention may include fluid pressure connections for the chamber 58 upstream or above a calibrated venture. The pressure chamber 53 may be connected to the downstream zone of the calibrated venture. From the differential pressure value and other properties of the fluid, the flow velocity of the fluid may be determined.

In another operational example, in like manner, determination of the pressure differentials across a calibrated orifice are used to determine the volumetric flow rate of fluid through the orifice.

It will be apparent to those skilled in the art that various changes may be made in the invention without departing from the spirit and scope thereof and therefore the invention is not limited by that which is disclosed in the drawings and specifications but only as indicated in the appended claims.

Although the invention disclosed herein has been described in terms of specified and presently preferred embodiments which are set forth in detail, it should be understood that this is by illustration only and that the invention is not necessarily limited thereto. Alternative embodiments and operating techniques will become apparent to those of ordinary skill in the art in view of the present disclosure. Accordingly, modifications of the invention are contemplated which may be made without departing from the spirit of the claimed invention.

The invention claimed is:

1. A pressure differential measuring instrument comprising:
    a pressure differential displacement means isolating opposed fluid pressure environments from each other for producing a substantially linear translation proportional to a pressure differential quantity between said pressure environments;
    a motion translation means for converting said substantially linear translation of said pressure differential displacement means to a proportional first angular displacement about an axis of a first axially extended element;
    a calibrated chamber isolation means that is torsionally stressed by said first angular displacement to angularly displace a second axially extended element;
    electrical sensing means for converting said second element angular displacement to a proportional change in an electrical property; and,
    means for translating said electrical property change to a value corresponding to said pressure differential.

2. A pressure differential measuring instrument as described by claim 1 wherein said electrical sensing means is disposed in an environment that is isolated from said opposed pressure environments.

3. A pressure differential measuring instrument as described by claim 2 wherein said electrical sensing means comprises a piezoresistive element.

4. A pressure differential measuring instrument as described by claim 3 wherein said electrical sensing element is a strain gauge.

5. A pressure differential measuring instrument as described by claim 1 wherein said linear displacement of said pressure differential displacement means imposes a torsional stress upon said motion translation means to generate said first angular displacement of said first axially extended element.

6. A pressure differential measuring instrument as described by claim 1 wherein said motion translation means converts the lineal displacement of said differential displacement means to an angular displacement of a body aligned about an axis of rotation.

7. A pressure differential measuring instrument as described by claim 1 wherein said pressure differential displacement means comprises a diaphragm element isolating said opposed pressure environments and said motion translation means comprises a first plate secured to said diaphragm element and a second plate element secured to said calibrated chamber isolation means.

8. A pressure differential measuring instrument as described by claim 7 wherein said calibrated chamber isolation means comprises a cylindrical element having a cylindrical wall formed about a corresponding axis of revolution with an open end and a closed end, said open end being secured to housing structure separating said opposed pressure environments from a third isolated environment, said cylindrical element closed end being secured to said second axially extended element.

9. A method for measuring a pressure differential comprising the steps of:

translating a pressure differential between respectively isolated first and second fluid pressure environments to substantially lineal displacement of a sensing first element separating said first and second environments;

transferring said lineal displacement to angular displacement of a second element about an axis of revolution;

torsionally stressing a second environmental isolation element by said angular displacement to impose a corresponding torsional strain upon said isolation element;

transferring said torsional strain to an electrical sensing circuit to impose electrical property changes upon said electrical sensing circuit; and, translating said electrical property changes to proportional values of pressure differential between said chambers.

10. A method for measuring a pressure differential as described by claim 9 wherein said transfer of lineal displacement to angular displacement is confined within said second environment.

11. A method for measuring a pressure differential as described by claim 9 wherein said electrical property changes are piezoresistive.

12. A method for measuring a pressure differential as described by claim 10 wherein said third environment is separated from said second pressure environment by said pressure isolation element.

13. A method for measuring a pressure differential as described by claim 9 wherein said lineal displacement of said first element is substantially parallel with said second element axis of revolution.

14. A method for measuring a pressure differential as described by claim 13 wherein a structural plane of said first element is positioned substantially parallel with a structural plane of said second element.

15. A method for measuring a pressure differential as described by claim 14 wherein structural links between said first and second plane are secured thereto, respectively, at an angle to said parallel planes and at an off-set position from said axis of revolution.

16. A pressure differential sensor comprising:
first and second fluid pressure chambers;
a diaphragm separating said first and second chambers;
a first plate means secured to said diaphragm within said second chamber;
a third pressure chamber isolated from said first and second chambers;
a torsionally calibrated isolation cylinder separating said second and third chambers, one end of said isolation cylinder secured to a chamber wall and an opposite end of said cylinder secured to a second plate means, a plane of said second plate means disposed substantially parallel with a plane of said first plate means and substantially perpendicular to an axis of revolution of said isolation cylinder;
a plurality of structural links secured between said first and second plate means at an off-set angle to said parallel planes;
structural shaft means secured at one end thereof to said second plate means and projected co-axially within said isolation cylinder from said second plate means, said shaft means being disposed within said third pressure chamber;
electrical sensing means secured to an opposite portion of said shaft means within said third pressure chamber; and,
electric circuit means including said electrical sensing means to correlate electrical property changes of said electrical sensing means to pressure differential values respective to said first and second fluid pressure chamber values.

17. A pressure differential sensor as described by claim 16 wherein said first fluid pressure chamber is charged with the static fluid pressure of a fluid flow stream above a venture and the second fluid pressure chamber is charged with the static fluid pressure
of said fluid flow stream below said venture to determine the velocity of said flow stream.

18. A pressure differential sensor as described by claim 16 wherein said electrical sensing means comprises piezoresistive means.

19. A pressure differential sensor as described by claim 16 wherein said electrical sensing means comprises strain gauge means.

20. A pressure differential sensor as described by claim 16 wherein said first fluid pressure chamber is charged with the static fluid pressure of a calibrated fluid flow orifice and the second fluid pressure chamber is charged with the static fluid pressure of said fluid flow stream below said orifice to determine the volumetric flow rate of said flow stream.

* * * * *